Patented Aug. 9, 1927.

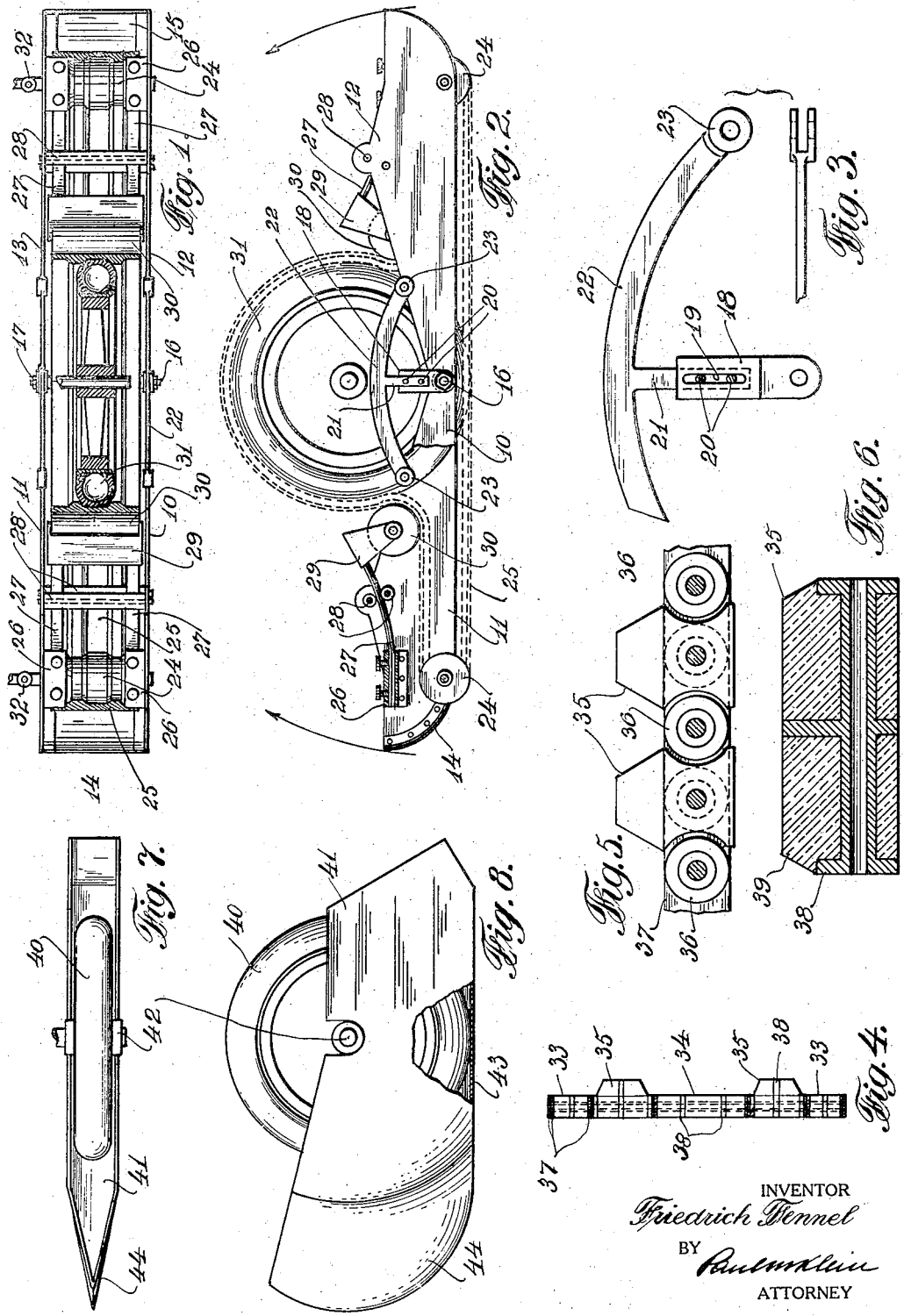

1,638,329

UNITED STATES PATENT OFFICE.

FRIEDRICH FENNEL, OF JERSEY CITY, NEW JERSEY.

TRACTION ATTACHMENT FOR AUTOMOBILES.

Application filed July 30, 1926. Serial No. 125,871.

The present invention relates to traction attachment for wheeled vehicles in general and particularly to automobiles having inflatable tires.

One of the prime objects of this invention is the provision of a collapsible, readily transportable and easily attachable device which may be carried within the vehicle in a comparatively small space when not in use and which may be readily affixed when desired, and within a short period of time.

Another object of my device is to provide means whereby the traction belt employed therein is constantly subjected to the necessary tension which assures a steady friction pressure against a wheel thereby assuring an uninterrupted operation of the device under all working conditions.

A further object of my device is to provide a traction belt having the properties of being rigid in transverse direction while flexible longitudinally and having a high coefficient of friction so as to assure a secure grip upon the surface over which the vehicle travels.

The foregoing and further objects will be more fully apparent from the following description and the accompanying drawings, forming part of this disclosure, and in which:—

Figure 1 is a top view, partially in section, of a left-hand part of my device,

Figure 2 is a side elevation thereof, partially broken away,

Figure 3 is a detail view of a spreader, by means of which the collapsible frame may be held in operative or open position, Figure 4 represents an enlarged section through the traction belt, Figure 5 illustrates a detail elevation of a portion of the traction belt, Figure 6 is a longitudinal cross section through a prismatic member of my traction belt, Figure 7 is a top view and, Figure 8 is a side elevation of a front wheel sled arrangement for a vehicle.

Referring to the drawings, numerals 10 and 11 denote the front side members or walls, and numerals 12 and 13 the rear side members or walls of the frame of my device, which side members or walls are held together respectively by curved end connections 14 and 15.

The walls of my device are hinged at the points indicated at 16 and 17, and attached to their hinged joint are plates 18 provided with slots 19 through which pass bolts 20. These bolts also pass through the extensions 21 of yokes 22 having bifurcated ends 23 adapted to engage the inclined upper faces of the frame walls.

These yokes 22, held in position by bolts 20, press down the frame sides, keeping them in open or operative position.

Near or at the ends of the frames are provided fixed guide idlers 24 which are shaped to correspond with their contour to a traction belt indicated at 25. Attached to the frames above idlers 24 are spring holders 26, which accommodate springs 27 passing between guide rolls 28 and terminating in bearing yokes 29, suspending idlers 30.

The endless traction belt 25 passes over the major upper portion of the driving wheel of the vehicle, indicated at 31, and between the wheel and the resiliently suspended idlers 30, and further passes over fixed idlers 24 and below the lowermost points of wheel 31.

It will be seen that idlers 30 are disposed below the axis of the wheel, assuring the thorough engagement of the belt with the wheel. The springs 27 tend to exert a constant pressure upon the belt, whereby the latter is held always under tension during operation. The motion transmitted from the driving wheel to the belt is enhanced by the contact of the lowermost portion of the wheel with the horizontal part of the endless belt.

At the outer faces of the frame walls 11 and 13 I preferably provide hinged connections 32 by means of which the right and left hand wheel frames are connected between each other and allowing also a rigid attachment to the chassis of the vehicle.

Referring to Figures 4, 5 and 6 I have shown details of the endless traction belt which consists of a chain of cylindrical end members 33, a central cylindrical member 34 and prismatic members 35.

In Figure 5 there will be seen intermediate cylindrical members 36 disposed between the prismatic members. All of these members are connected by means of chain links 37. The prismatic members 35 are arranged in double rows so as to form a profile indicated in Figure 1. The valley formed between the rows of members 35 serves as a longitudinal guide in which operates the vehicle wheel 31. The contour of idlers 24 corresponds with the outline of the inner face of the endless belt, which is also guided by these idlers.

Referring to Figures 4 and 6, it will be seen that each chain member consists of a steel frame 38 and a resilient filler 39, which construction gives not only rigidity, but imparts also resilience and increases friction which is highly necessary in this device.

In attaching my device to the wheels of a vehicle, the tire of the wheel is deflated. The frame is arranged about the wheel and the belt is slipped over the deflated tire. Now the yokes 22 are put in place so that they spread the frame parts to a horizontal position. Then the tire in inflated, thereby stretching the belt. The left and right-hand parts of my device are then connected by means of links 32 (Fig. 1). Now the device is ready for operation. When it is desired to remove the device from the vehicles the tire is deflated, the yokes are removed and the belt is slipped off the tire. Now the connections between the left-hand and righthand parts of my device are severed and the frames are removed from underneath the wheels.

In Figures 7 and 8, I illustrated the left-hand front wheel of a vehicle, indicated at 40, provided with a sled attachment 41 which is readily slipped under the axis 42 of the front wheel, the latter resting upon the gliding face 43 of the attachment. The pointed front end 44 of the attachment allows for steering through snow, sand or mud, while preventing the front wheels from sinking thereinto.

Referring to Figure 2, there are shown two arrows, indicating the manner in which the two ends of the wheel attachment are brought together when the attachment is to be collapsed and carried in the vehicle, when not in use. By disconnecting the resiliently supported idlers 30, the entire frame of my device can be folded very neatly and will require a minimum of space within the vehicle.

Having thus described my invention I claim:—

1. A traction attachment for wheeled vehicles comprising a collapsible frame adapted to be placed about a wheel of a vehicle, means associated with said frame for keeping it in operative or open position, a plurality of fixed and resiliently suspended idlers held within said frame, an endless belt arranged within the latter and adapted to pass over a portion of the wheel and to be guided and stretched by said idlers.

2. A traction attachment for wheeled vehicles, comprising a collapsible frame adapted to be placed about a wheel of a vehicle, an adjustable spreading member associated with said frame for keeping it in operative or open position, a plurality of fixed and resiliently suspended idlers arranged within said frame, an endless belt provided within the latter and adapted to pass over a major upper portion and below said wheel, said fixed idlers adapted to guide said belt in longitudinal direction of said wheel, and said resiliently suspended idlers adapted to take up the slack of said belt.

3. A traction attachment for wheeled vehicles, comprising a collapsible frame adapted to be placed about the wheel of a vehicle, an adjustable spreader engaging said frame for keeping it in open or operative position, a pair of fixed guide idlers arranged near the ends of said frame, a pair of resiliently suspended idlers supported by it and disposed in near proximity and below the axis of said wheel, an endless traction belt passing over a major portion of said wheel and below the latter and over said fixed idlers, while said resiliently suspended idlers exert a constant pressure upon said belt.

4. A traction attachment for wheeled vehicles, comprising a collapsible frame adapted to be placed about the wheel of a vehicle and provided with a hinge joint at about its center, an adjustable spreader connected with said joint and adapted to keep said frame in spread or operative position, a pair of fixed guide idlers arranged at the ends of said frame, resiliently suspended idlers disposed near the wheel, spring holders provided within said frame, roller guides connecting the walls of said frame, springs held by said spring holders and passing between said roller guides and supporting at their free ends said resiliently suspended idlers, an endless traction belt disposed within said frame and passing over the major portion of said wheel, below said resiliently suspended idlers over said fixed idlers and under said wheel, said resiliently suspended idlers disposed below the axis of said wheel adapted to keep said belt under constant tension.

Signed at New York in the county of New York and State of New York.

FRIEDRICH FENNEL.